United States Patent
Smalley et al.

(10) Patent No.: US 7,138,100 B2
(45) Date of Patent: Nov. 21, 2006

(54) PROCESS FOR MAKING SINGLE-WALL CARBON NANOTUBES UTILIZING REFRACTORY PARTICLES

(75) Inventors: Richard E. Smalley, Houston, TX (US); Robert H. Hauge, Houston, TX (US)

(73) Assignee: William Marsh Rice Univesity, Houston, TX (US)

( * ) Notice: Subject to any disclaimer, the term of this patent is extended or adjusted under 35 U.S.C. 154(b) by 548 days.

(21) Appl. No.: 10/300,135

(22) Filed: Nov. 20, 2002

(65) Prior Publication Data

US 2003/0147802 A1    Aug. 7, 2003

Related U.S. Application Data

(60) Provisional application No. 60/334,455, filed on Nov. 30, 2001, provisional application No. 60/332,333, filed on Nov. 21, 2001.

(51) Int. Cl.
*D01C 5/00* (2006.01)

(52) U.S. Cl. .............................. 423/447.3; 427/249.1; 977/842

(58) Field of Classification Search ............. 423/447.3; 427/249.1; 977/842
See application file for complete search history.

(56) References Cited

U.S. PATENT DOCUMENTS

| | | | |
|---|---|---|---|
| 6,221,330 B1 | 4/2001 | Moy et al. | |
| 6,761,870 B1 * | 7/2004 | Smalley et al. | 423/447.3 |
| 6,890,986 B1 * | 5/2005 | Pruett | 524/495 |

2002/0102193 A1    8/2002   Smalley et al.

FOREIGN PATENT DOCUMENTS

| | | |
|---|---|---|
| WO | WO 00/17102 | 3/2000 |
| WO | WO 00/26138 | 5/2000 |
| WO | WO 02/79082 | 10/2002 |

OTHER PUBLICATIONS

Dresselhaus et al., Science of Fullerenes and Carbon Nanotubes, San Diego: Academic Press, Ch. 19 (1996).
Bronikowski et al., "Gas-Phase Production of Carbon Single-Walled Nanotubes from Carbono Monoxide via the HiPco Process: A Parametric Study," J. Vac. Sci. Technol. A, vol. 19, pp. 1800-1805 (2001).

(Continued)

*Primary Examiner*—Colleen P. Cooke
*Assistant Examiner*—Rebecca M. Stadler
(74) *Attorney, Agent, or Firm*—Edward Mickelson; Ross Spencer Garsson; Winstead Sechrest & Minick P.C.

(57) ABSTRACT

A continuous gas-phase method for producing single-wall carbon nanotubes at high catalyst productivity and high yield is disclosed. The method involves the use of a novel in-situ formed catalyst to initiate and grow single-wall carbon nanotubes using a carbon-containing feedstock in a high temperature and pressure process. The catalyst comprises in-situ-generated transition metal particles in contact with in-situ-generated refractory particles. The population of nucleating sites for single-wall carbon nanotubes is enhanced due to the ease of formation of a population of refractory particles. These, in turn, improve the nucleation and stability of the transition metal particles that grow on them. The larger number of transition metal particles translate into a larger number of sites for single-wall carbon nanotube production. The higher catalyst yields provide a means for obtaining higher purity single-wall carbon nanotubes.

50 Claims, 3 Drawing Sheets

OTHER PUBLICATIONS

Nikolaev et al., "Gas-Phase Catalytic Growth of Single-Walled Carbon Nanotubes from Carbon Monoxide," Chemical Physics Letters, vol. 313, pp. 91-97 (1999).

Hafner et al., "Catalytic Growth of Single-Wall Carbon Nanotubes From Metal Particles," Chemical Physics Letters, vol. 296, pp. 195-202 (1998).

Dai et al., "Single-Wall Nanotubes Produced by Metal-Catalyzed Disproportionation of Carbon Monoxide," Chemical Physics Letters, vol. 260, pp. 471-475 (1996).

Cheng et al., "Bulk morphology and diameter distribution of single-walled carbon nanotubes synthesized by catalytic decomposition of hydrocarbons," Chmical Pysics Letters, vol. 289, pp. 602-610 (1998).

Cheng et al., "Large-scale and low-cost synthesis of single-walled carbon nanotubes by the catalytic pyrolysis of hydrocarbons," Applied Physics Letters, vol. 72, pp. 3282-3284 (1998).

Sen et al., "Carbon nanotubes by the metallocene route," Chemical Physics Letters, vol. 267, pp. 276-280 (1997).

Flahaut et al., "Synthesis of single-walled carbon nanotube-Co-MgO composite powders and extraction of the nanotubes," J. Materials Chemistry, vol. 10, pp. 249-252 (2000).

Li et al., "Preparation of Monodispersed Fe-Mo Nanoparticles as the Catalyst for CVD Synthesis of Carbon Nanotubes," Chem. Mater., vol. 13, pp. 1008-1014 (2001).

* cited by examiner

PROCESS FOR MAKING SINGLE-WALL CARBON NANOTUBES UTILIZING REFRACTORY PARTICLES

PRIORITY APPLICATION REFERENCES

This application claims priority from U.S. patent application Ser. Nos. 60/332,333, filed Nov. 21, 2001, and 60/334,455 filed Nov. 30, 2001, which applications are incorporated herein by reference.

The present invention was made in connection with research pursuant to grant number NCC9-77 from the National Aeronautics and Space Administration.

FIELD OF INVENTION

The present invention relates broadly the field of single-wall carbon nanotubes, also known as tubular fullerenes or, commonly, "buckytubes." More specifically, the invention relates to the production of single-wall carbon nanotubes in high yield and purity in a continuous process using a metallic catalyst with a carbon-containing feedstock at high temperature and pressure.

BACKGROUND OF THE INVENTION

Fullerenes are spheroidal, closed-cage molecules consisting essentially of $sp^2$-hybridized carbons typically arranged in hexagons and pentagons. Fullerenes, such as $C_{60}$, also known as Buckminsterfullerene, more commonly, "buckyballs," and $C_{70}$, have been produced from vaporized carbon at high temperature. Presence of a transition metal catalyst with the high temperature vaporized carbon results in the formation of single-wall tubular structures that may be sealed at one or both ends. These carbon cylindrical structures, known as single-wall carbon nanotubes or, commonly, "buckytubes" have extraordinary properties, including both electrical and thermal conductivity and high strength.

Nested single-wall carbon cylinders, known as multi-wall carbon nanotubes, possess properties similar to the single-wall carbon nanotubes; however, single-wall carbon nanotubes have fewer defects, rendering them stronger, more conductive, and typically more useful than multi-wall carbon nanotubes. Single-wall carbon nanotubes are believed to be much more free of defects than are multi-wall carbon nanotubes because multi-wall carbon nanotubes can survive occasional defects by forming bridges between the unsaturated carbon of the neighboring cylinders, whereas single-wall carbon nanotubes have no neighboring walls for defect compensation. Single-wall carbon nanotubes are individual molecules of carbon, and their chemistry and their interactions with materials are fundamentally different from that of multi-wall carbon nanotubes.

In defining the size and conformation of single-wall carbon nanotubes, the system of nomenclature described by Dresselhaus et al., *Science of Fullerenes and Carbon Nanotubes*, 1996, San Diego: Academic Press, Ch. 19, will be used. Single-wall tubular fullerenes are distinguished from each other by a double index (n, m), where n and m are integers that describe how to cut a single strip of hexagonal graphite such that its edges join seamlessly when the strip is wrapped onto the surface of a cylinder. When n=m, the resultant tube is said to be of the "arm-chair" or (n, n) type, since when the tube is cut perpendicularly to the tube axis, only the sides of the hexagons are exposed and their pattern around the periphery of the tube edge resembles the arm and seat of an arm chair repeated n times. When m=0, the resultant tube is said to be of the "zig zag" or (n,0) type, since when the tube is cut perpendicular to the tube axis, the edge is a zig zag pattern. Where n≠m and m≠0, the resulting tube has chirality. The electronic properties are dependent on the conformation, for example, arm-chair tubes are metallic and have extremely high electrical conductivity. Other tube types are metallic, semi-metals or semi-conductors, depending on their conformation. Regardless of tube type, all single-wall nanotubes have extremely high thermal conductivity and tensile strength.

Several methods of synthesizing fullerenes have developed from the condensation of vaporized carbon at high temperature. Fullerenes, such as $C_{60}$ and $C_{70}$, may be prepared by carbon arc methods using vaporized carbon at high temperature. Carbon nanotubes have also been produced as one of the deposits on the cathode in carbon arc processes.

Single-wall carbon nanotubes have been made in a DC arc discharge apparatus by simultaneously evaporating carbon and a small amount of Group VIIIB transition metal from the anode of the arc discharge apparatus. Arc discharge methods produce only small amounts of carbon nanotubes, intermingled with other non-nanotube carbon forms, with the population of these carbon nanotubes exhibiting significant variations in size and structure.

Another method of producing single-wall carbon nanotubes involves laser vaporization of a graphite substrate doped with transition metal atoms, such as nickel, cobalt, or mixtures thereof, to produce single-wall carbon nanotubes. The single-wall carbon nanotubes produced by this method tend to be in clusters, termed "ropes," of about 10 to about 1000 single-wall carbon nanotubes in parallel alignment, held together by van der Waals forces in a closely packed triangular arrangement. Nanotubes produced by this method vary in structure, although certain structures tend to predominate in some circumstances. Although the laser vaporization process produces an improved yield of single-wall carbon nanotubes, the product is still heterogeneous, and the nanotubes tend to be too tangled for many potential uses of these materials. In addition, the laser vaporization of carbon is a high-energy process, requiring substantial power input for vaporization of graphite.

Another way to synthesize carbon nanotubes is by catalytic decomposition of a carbon-containing gas by nanometer-scale metal particles supported on a substrate. The carbon feedstock molecules dissociate on the metal particle surface and the resulting carbon atoms combine to form nanotubes. The method typically produces imperfect multi-walled carbon nanotubes, but under the certain reaction conditions, can produce excellent single-wall carbon nanotubes. One example of this method involves the disproportionation of CO to form single-wall carbon nanotubes and $CO_2$ catalyzed by transition metal catalyst particles comprising Mo, Fe, Ni, Co, or mixtures thereof residing on a support, such as alumina. Although the method can use inexpensive feedstocks and moderate temperatures, the yield of single-wall carbon nanotubes can be low, with large amounts of other forms of carbon, such as amorphous carbon and multi-wall carbon nanotubes present in the product. The method often results in tangled carbon nanotubes and also requires the removal of the support material for many applications.

All-gas phase processes can be used to form single-wall carbon nanotubes. In one example of an all gas-phase process, single-wall carbon nanotubes are synthesized using benzene as the carbon-containing feedstock and ferrocene as the transition metal catalyst precursor. By controlling the partial pressures of benzene and ferrocene and by adding thiophene as a catalyst promoter, single-wall carbon nanotubes can be produced. However, this method suffers from simultaneous production of multi-wall carbon nanotubes, amorphous carbon, and other products of hydrocarbon pyrolysis under the high temperature conditions necessary to produce high quality single-wall carbon nanotubes.

Another method for producing single-wall carbon nanotubes involves an all-gas phase method using high pressure CO as the carbon feedstock and a gaseous transition metal catalyst precursor. ("Gas Phase Nucleation and Growth of Single-Wall Carbon Nanotubes from High Pressure Carbon Monoxide," International Pat. Publ. WO 00/26138, published May 11, 2000, incorporated by reference herein in its entirety). This method permits continuous nanotube production, and it has the potential for scale-up to produce commercial quantities of single-wall carbon nanotubes. This method is also effective in making single-wall carbon nanotubes without simultaneously making multi-wall nanotubes. Furthermore, the method produces single-wall carbon nanotubes in high purity, such that less than about 10 wt % of the carbon in the solid product is attributable to other carbon-containing species, which includes both graphitic and amorphous carbon. Although the carbon nanotubes from this product are of high quality and purity, there is still a need for a method for producing single-wall carbon nanotubes at higher catalyst productivity and feedstock yields in order to improve the process economics and produce high quality single-wall carbon nanotubes at lower cost.

The search for methods to produce single-wall carbon nanotubes at high yield and high catalyst productivity has been an on-going need in order to make nanotubes economically viable in various applications. Besides improving economics, higher process and catalyst yields provide routes to increased availability of larger amounts of single-wall carbon nanotubes. In conventional chemical processes, higher product yields can often be achieved with higher temperatures, pressures, catalyst and feed concentrations. Contrary to convention, these techniques have not been effective in making single-wall carbon nanotubes in the gas phase using CO as the carbon-containing feedstock. Although somewhat higher yields are observed at higher pressures, the higher yields can often be attributed to higher associated catalyst concentrations. In the gas phase, using CO as the carbon-containing feedstock, single-wall carbon nanotube yield decreases at temperatures above 1050° C., possibly due to metal cluster evaporation and chemical attack of the metal catalyst clusters by CO. (See Bronikowski, et. al., $J$ $Vac.$ $Sci.$ $Technol.$ $A$ 19:1800 (2001)).

Although transition metal catalyst particles formed from the dissociation of the transition metal precursors can result in high quality single-wall carbon nanotubes, higher yields are confounded by inherent limitations in metal clustering. Obstacles to transition metal clustering include, among other factors, low metal-metal binding energies, metal evaporation and chemical attack by CO to form metal carbonyls. In the case of iron, a preferred transition metal catalyst, the binding energy for a Fe—Fe dimer is relatively low and on the order of 1 eV, and the electronic structure of the free iron atoms is not highly conducive for the formation of dimers from the association of free atoms. Low binding energies and electronic structure makes initial nucleation more difficult and metal evaporation more problematic.

Metal clustering dynamics can be improved to some extent by nucleating the clusters using other transition metals having higher metal-metal binding energies. For example, nickel, which has a metal-metal binding energy on the order of 2 eV, or approximately twice that of iron, can be introduced into the reactor through the dissociation of another catalyst precursor, such as nickel tetracarbonyl. The presence of nickel is expected to facilitate nucleation and growth of clusters comprising both iron and nickel. Although nucleation may be improved, use of different metal species can affect the characteristics of the single-wall carbon nanotubes formed as well as the nanotube yield. Generally, the addition of other transition metals to assist cluster nucleation and growth can provide some improvement in single-wall carbon nanotube production. However, generally, the use of mixtures of iron and other transition metals does not result in substantial yield enhancements.

Not meaning to be held by theory, the formation of stable transition metal catalyst clusters of the appropriate size can be a rate-limiting step in the production of single-wall carbon nanotubes. Furthermore, in a high pressure reactor operating with very short residence times, on the order of a few hundred milliseconds in a "once-through" mode, the need for fast, stable metal clustering becomes even more critical to high yield production of single-wall carbon nanotubes. Longer residence times may enhance the carbon nanotube yield, but longer residence times also allow the metal clusters to grow large through Oswald ripening. If the cluster diameter exceeds about 3 nanometers, it becomes overcoated with amorphous and graphitic carbon, as the growth of these forms of carbon are energetically favored on large metal clusters compared to the formation of single-wall carbon nanotubes. Metal catalyst particles that are too large to grow single-wall carbon nanotubes therefore contribute to a poor ratio of carbon nanotube product to catalyst.

Accordingly, there remains a need for a method for producing single-wall carbon nanotubes at high yield and high catalyst productivity.

SUMMARY OF THE INVENTION

This invention relates to a method of producing single-wall carbon nanotubes in the gas phase at high yield and high catalyst productivity using a novel in-situ-formed catalyst system, comprising transition metal catalyst particles and refractory particles. In this method, single-wall carbon nanotubes are produced in a reactor at high temperature and pressure using a carbon-containing feedstock gas, such as a hydrocarbon or carbon monoxide (CO), and a catalyst comprising in-situ-generated transition metal catalyst particles and in-situ-generated refractory particles. "Refractory particles," used herein, refers to a refractory material, generally a refractory metal oxide, carbide or oxycarbide, or other ceramic-like material, able to withstand the temperatures required in the gas phase production of single-wall carbon nanotubes. The refractory particles are typically oxides, carbides, oxycarbides, nitrides, carbonitrides, borides and sulfides of aluminum, titanium, tungsten, zinc, zirconium, magnesium, silicon, phosphorous, or combinations thereof, wherein the refractory particle is able to withstand the high temperatures, typically up to about 1500° C., used in the synthesis of the single-wall carbon nanotubes. Refractory particles can also include ceramics, zeolites, and ceramic-like materials.

The transition metal catalyst particles are formed from the clustering of transition metal atoms liberated via thermal decomposition of transition metal-containing precursor compounds. Complications of transition metal cluster nucleation and growth are mitigated by the presence of refractory materials or agents, in the form of refractory particles, which provide surfaces upon which metal cluster nucleation and growth can occur. In the present invention, these refractory agents are generated in the reactor in a highly dispersed state in the presence of transition metal-containing precursor compounds. The in-situ-generated refractory particles readily mix and collide with the transition metal species generated from the transition metal catalyst precursors. The transition metal atoms nucleate on the refractory particles to form transition metal catalyst particles on the refractory particles. The transition metal atoms in contact with the refractory particles nucleate and cluster at a faster rate and with greater stability than transition metal species in the gas. The number of metal catalyst particles that are nucleated, and the resulting number of nanotubes produced, can be increased by increasing the concentration of refractory precursor in the reactor.

DETAILED DESCRIPTION OF THE INVENTION

Figure 1:
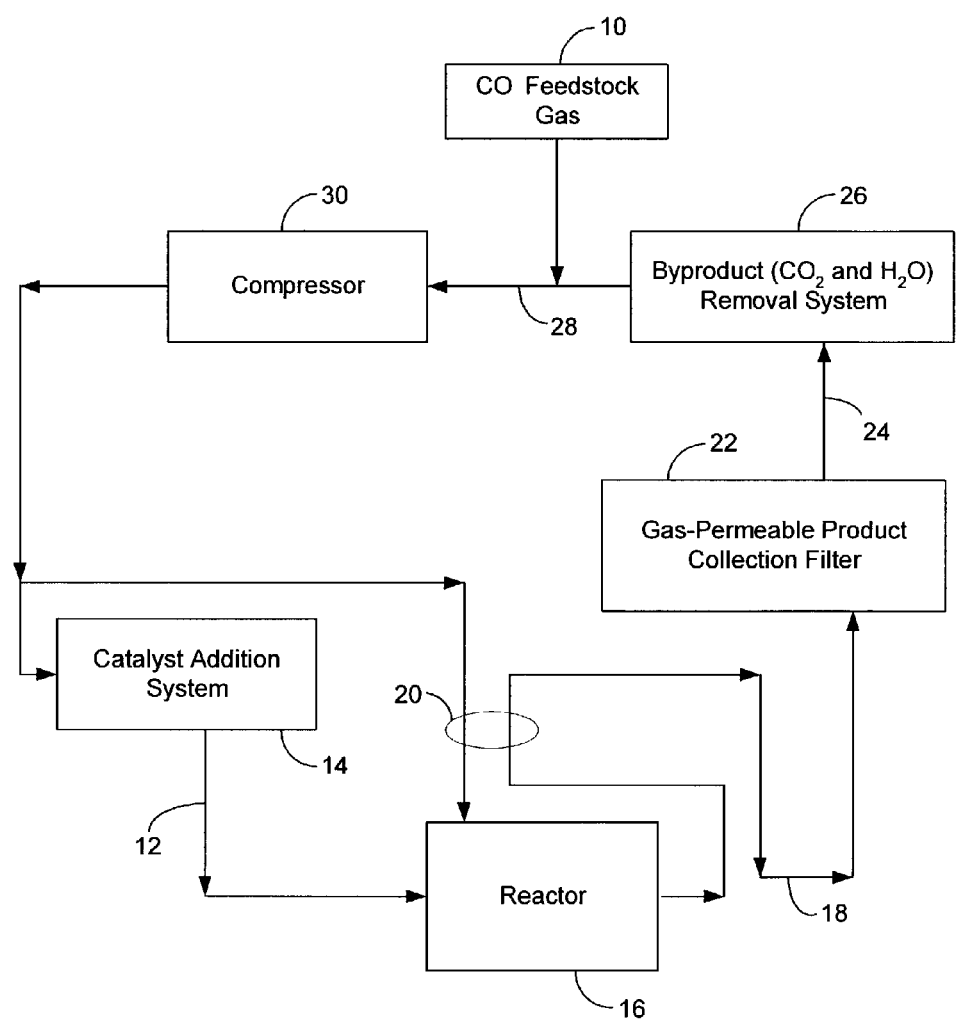
FIG. 1 shows a general schematic of flows in an apparatus for one embodiment of the present invention in which metal catalyst precursors and refractory precursors are used in a catalyst system to produce single-wall carbon nanotubes.

The present invention encompasses a continuous, high temperature and high pressure gas-phase method of producing single-wall carbon nanotubes using a carbon-containing feedstock, and a novel catalyst system comprising in-situ-generated transition metal particles and in-situ-generated refractory particles to substantially enhance the production yield of single-wall carbon nanotubes. "Substantially" means the yield improvement is at least about twice that of the same process that does not include the refractory particles. In the presence of refractory particles, initiation of metal cluster formation on refractory particles can proceed at reaction rates exceeding that in the gas phase without refractory particles, and the metal cluster initiation can compete more favorably with catalyst cluster growth. Using refractory particles as nucleation sites, the effect of low metal-metal binding energy on transition metal clustering is minimized because of the potential for stronger metal-support interaction between the refractory particle and the transition metal is greater than the transition metals' binding energy to each other. The metal-support interaction provided by the refractory stabilizes the metal cluster nucleation and makes the metal particle less susceptible to undesired evaporation and chemical attack by CO. Rapid initiation of a single-wall carbon nanotube on the metal particle also serves to reduce the exposed metal surface area available for evaporation and CO attack.

Since the transition metal clusters are more stable when associated with refractory particles, a broader range of operating conditions, such as higher temperatures and pressures can be used with minimal metal evaporation from the metal particles. The higher stability of the metal clusters when associated with refractory particles also provides an opportunity to independently select the preferred transition metal or metals to achieve a desired nanotube conformation with less regard to metal-metal clustering dynamics.

When in contact with a refractory particle, the metal nuclei are able to cluster at a faster rate to a size conducive to growing single-wall carbon nanotubes. Transition metal clusters can form in the absence of nucleating agents, but the rate of catalyst cluster initiation is much slower than when refractory particles are used. Without being bound by theory, it is believed that when the transition metal catalyst clusters are in contact with the refractory, more surface area of the transition metal is available and more effective use of the transition metal can be achieved. In addition to providing more available transition metal surface area, small transition metal clusters may form around local inhomogeneities (cracks, points, fissures, etc.) on the catalyst support and this local aggregation of small particles, in turn, limits the rate of formation of large metal clusters which are inactivated by carbon overcoating. Likewise, the energetics of metal support interaction mitigates Oswald ripening of large metal particles.

In contrast to transition metal nucleation with only metals, which can occur randomly in time and space throughout the length of the reactor, the nucleation of the transition metal particles on the refractory particles occurs extremely rapidly near the inlet of the reactor where the refractory material is formed, such that more of the reactor residence time is available for growing single-wall carbon nanotubes before the gaseous stream comprising the single-wall carbon nanotube product exits the reactor. By initiating the metal clusters essentially at the same time and location in the reactor, more consistency and homogeneity of the single-wall carbon nanotubes produced can be achieved.

The refractory precursors readily nucleate as nanometer-scale particles and provide nucleation sites for transition metal clusters. By providing refractory particles as stable nucleating sites for the transition metal clusters, it is possible to substantially increase the number of metal clusters and single-wall carbon nanotubes catalyzed thereon, proportional to the refractory particle concentration. Since the nucleation and growth of refractory particles are much more efficient than the nucleation and growth of transition metal clusters alone, increasing the concentration of refractory particles results in a proportional increase in the number of transition metal particles nucleated, which provides catalyst sites for a proportional increase in yield of single-wall carbon nanotubes. Thus, the ability to control and increase the catalyst nucleation sites provides a means for controlling and increasing the amount and catalytic yield of single-wall carbon nanotubes.

Refractory particles can be formed in the reactor either by thermolysis of refractory precursors or by reaction of refractory precursors with other reactant compounds, herein called "refractory reactant."

Simultaneous with the forming of the refractory particles, either by reaction or thermolysis, transition-metal-containing precursors in a carrier gas, which can be the same or different than the gas stream used for the refractory precursors, are introduced into the reactor used to make single-wall carbon nanotubes. Contact with the hot carbon-containing gaseous feedstock causes the transition metal precursors to dissociate. The dissociated transition metal atoms and, to some extent, the metal-containing fragments, associate with the refractory particles and with each other to form metal catalyst clusters on the refractory particles. The dissociation of the transition-metal-containing precursors can also be facilitated upon direct contact with the surface of refractory particles formed.

If the refractory material is to be made by reaction with another compound, then a refractory reactant stream comprising a refractory reactant and a carrier gas is provided and kept separate from the refractory precursor stream until near or at the inlet of the reactor for making single-wall carbon nanotubes. When the refractory precursor stream and the refractory reactant stream come in contact, the refractory precursor and refractory reactant readily react to form a refractory material in the form of multiple nanometer-scale particles. The carrier gas for the refractory reactant stream can comprise nitrogen, inert gases, the carbon-containing feedstock gas or a combination thereof. Preferably, the carrier gas is the carbon-containing feedstock gas.

After the catalyst precursor stream, the refractory precursor stream, and any refractory reactant stream are injected into the reactor, the streams are mixed with the carbon-containing feedstock gas by any appropriate technique to form the mixed gas stream. The mixed gas stream may be held at a desirable temperature for a sufficient duration to allow the formation of single-wall carbon nanotubes by the catalytic action of the catalyst clusters nucleated on the refractory particles. The resulting product stream comprises single-wall carbon nanotubes in suspension in the mixed gas stream.

In one embodiment of the invention, the carbon-containing feedstock gas stream is preheated before being introduced into the reactor to a temperature sufficient to heat the catalyst precursor streams and effect the dissociation of the transition metal-containing catalyst precursor, and sufficient to initiate and grow single-wall carbon nanotubes in the reactor. The catalyst system is introduced in one or more individual gaseous catalyst streams separate from the heated carbon-containing feedstock gas. The catalyst system comprises a catalyst precursor stream comprising a transition metal-containing precursor, a refractory precursor stream comprising a refractory particle precursor, an optional refractory reactant stream comprising a refractory reactant, if needed to react with the refractory precursor to form the refractory material. Each of the streams comprises a carrier gas, which can comprise nitrogen, an inert gas, the carbon-containing feedstock gas, or combinations thereof. Preferably, the carrier gas comprises the carbon-containing feedstock gas. Prior to entering the reactor and mixing with the heated carbon-containing feedstock gas, the catalyst precursor stream is kept at a temperature below the dissociation temperature of the catalyst precursor. The refractory precursor is kept at a temperature below the thermolysis temperature of the refractory precursor.

The catalyst addition system can comprise one or more streams for introducing a transition metal catalyst precursor and a refractory precursor into the reactor for making single-wall carbon nanotubes. If the transition metal catalyst precursor molecules and the refractory precursor molecules are non-reactive with each other prior to entering the reactor, and if the refractory precursor molecules are converted to a refractory material by thermolysis, then, in such an embodiment, one stream comprising the catalyst precursor and the refractory precursor can be used. If the refractory precursor molecules are converted to a refractory material by reaction with another reactant, then the catalyst addition system would also comprise a separate precursor reactant stream wherein the precursor reactant does not contact the refractory precursor until the refractory precursor and precursor reactant streams merge just prior to, or upon entering the reactor, wherein they readily mix, react and form nanometer-scale refractory particles.

Regardless if one or more catalyst streams are used in the catalyst addition system, any stream containing the transition metal catalyst precursor is kept below the dissociation temperature of the transition metal catalyst precursor until entering the reactor. Upon entering the reactor, the transition metal catalyst precursor is heated by the carbon-containing feedstock gas to a temperature above its dissociation temperature. Upon dissociation into metal atoms and other fragments, the transition metal atoms and transition metal-containing fragments cluster. Due to the strong metal interaction with the refractory particles and due to large number of refractory particles present at the time of metal clustering, the transition metal clusters are nucleated and stabilized by the refractory particles. The transition metal particles on the refractory particles grow to a sufficient size whereupon single-wall carbon nanotubes initiate and grow in the presence of the hot carbon-containing feedstock gas.

In one embodiment, the refractory material is produced by thermolysis of the refractory precursor. As the refractory precursor enters the reactor, the heat from the heated carbon-containing feedstock gas thermolyzes the refractory precursor to a refractory material in the form of nanometer-scale particles. The transition metal catalyst precursor is also heated by the carbon-containing feedstock gas and is dissociated into metal atoms and other chemical fragments. The transition metal atoms, and to some extent, transition metal-containing fragments, nucleate on the refractory particles and form metal catalyst clusters which, in turn, initiate and form single-wall carbon nanotubes.

In this embodiment, single-wall carbon nanotubes are produced by a method comprising: (a) providing a catalyst precursor stream comprising (i) a transition metal catalyst precursor comprising at least one atom, of at least one transition metal selected from the group consisting of Group VIb elements, Group VIIIb elements and combinations thereof, (ii) a refractory precursor comprising at least one atom of at least one element selected from the group consisting of aluminum, silicon, titanium, tantalum, ruthenium, uranium and combinations thereof, wherein the transition metal catalyst precursors and the refractory precursor is are dissolved, suspended, or both in a carrier gas, selected from the group consisting of carbon monoxide, nitrogen, inert gases and combinations thereof, wherein the carrier gas is at a temperature below the decomposition temperature of the transition metal catalyst precursor, below the thermolysis temperature of the refractory precursor and below the minimum single-wall carbon nanotube formation initiation temperature (b) providing a carbon-containing feedstock gas stream at a temperature above the minimum single-wall carbon nanotube formation initiation temperature; and (c) mixing the carbon-containing feedstock gas stream, the transition metal catalyst precursor stream, and the refractory precursor stream to form a mixed gas stream, wherein (i) the catalyst precursor reaches a temperature above the decomposition temperature of the transition metal catalyst precursor, (ii) the temperature is sufficient to thermolyze the refractory precursor to form refractory material in the form of refractory particles, (iii) the temperature is sufficient to promote the initiation or growth of transition metal catalyst clusters on the refractory particles, and (iv) the temperature is sufficient to promote the initiation and growth of single-wall carbon nanotubes on the transition metal catalyst clusters to form the single-wall carbon nanotubes in the mixed gas stream.

In another embodiment, the refractory material is produced by reaction between a refractory precursor and another reactant. For example, a refractory material, such as alumina, $Al_2O_3$, can be formed by the reaction of a refractory precursor, such as trimethylaluminum (TMA) $Al(CH_3)_3$, and a refractory reactant, such as water $H_2O$. In this embodiment, the refractory precursor is injected in one stream into the reactor and a stream comprising the refractory reactant is injected separately into the reactor. At or near the inlet of the reactor, the refractory precursor and the refractory reactant contact each other and readily react to form refractory material in the form of nanometer-scale particles. As the transition metal-containing catalyst precursor enters the reactor and is heated by the hot carbon-containing gas feedstock, the transition metal atoms, and to some extent, transition metal-containing fragments, cluster on the refractory particles. When the metal clusters are of sufficient size, single-wall carbon nanotubes initiate and grow. The transition metal catalyst precursor and the refractory precursor may be introduced in separate streams or in the same stream, provided the precursors do not react with each other. For example, the refractory precursor and the transition metal precursor can be introduced into the reactor in the same stream with a carrier gas. For operating control and flexibility, however, it is preferable to provide each precursor or reactant in a separate stream.

In this embodiment, single-wall carbon nanotubes are produced by a method comprising: (a) providing a transition metal catalyst precursor stream comprising a carrier gas and a transition metal catalyst precursor comprising at least one atom of at least one transition metal selected from the group consisting of Group VIb elements, Group VIIIb elements, and combinations thereof, wherein the transition metal catalyst precursor stream is at a temperature below the decomposition temperature of the transition metal catalyst precursor; (a) providing a refractory precursor stream, comprising a carrier gas and a refractory precursor, (b) providing a refractory reactant stream, comprising a compound capable of reacting with the refractory precursor to form a refractory; (c) providing a carbon-containing feedstock gas stream at a temperature above the minimum single-wall carbon nanotube formation initiation temperature; and (d) mixing the carbon-containing feedstock gas stream with refractory precursor stream, the refractory reactant stream, and the transition metal catalyst precursor stream to form a mixed gas stream, wherein (i) the transition metal catalyst precursor reaches a temperature above the decomposition temperature of the metal catalyst precursor, (ii) the refractory precursor reacts with the refractory reactant to form refractory particles, (iii) the temperature is sufficient to promote the initiation and growth of metal catalyst clusters on the refractory particles, and (iv) the temperature is sufficient to promote the initiation and growth of single-wall carbon nanotubes on the metal catalyst clusters and to form the single-wall carbon nanotubes in the mixed gas stream.

All reactant and precursor species are introduced in a volatile form into the reaction zone. The carrier gases used for introduction of the catalyst precursor, refractory precursors and any reactant gases can comprise nitrogen, an inert gas, such as argon, or the carbon-containing feedstock gas. Since any added non-feedstock gas would build up in a recycled system and require removal, the use of the carbon-containing feedstock gas is the preferred carrier gas for any transition metal catalyst precursor, refractory precursor, and refractory reactant molecules. Although not meaning to limit the scope of the present invention, carbon monoxide (CO) will be used as the carbon-containing feedstock gas in describing various embodiments of the present invention.

Any liquid reactant or precursor compounds can be introduced by bubbling a carrier gas, such as CO, through the liquid reactants or precursors to introduce these molecules into the reactor. Alternatively, for those reactants and precursors which are conveniently sublimable, the carrier gas stream can be flowed through the vapor of the sublimed reactant and/or precursor molecules to introduce such molecules into the reactor. Sublimation can also be done by providing a heated carrier gas stream to the species to be sublimed.

Prior to introduction into the reactor, the carbon feedstock gas stream is heated to a temperature above the minimum initiation temperature for single-wall carbon nanotube formation. As the heated feedstock gas enters the reactor, a mixed gas stream is formed and the catalyst precursor molecules are heated to a temperature above which the precursors dissociate and metal clusters form on the refractory particles. The temperature of the mixed stream is also sufficient to promote the initiation and growth of single-wall carbon nanotubes on the catalyst clusters. Single-wall carbon nanotubes grow in the reactor and are suspended in the mixed gas stream as they flow through the reactor in the mixed gas stream. After exiting the heated reactor, the single-wall carbon nanotubes are separated from the mixed-gas. stream by collecting the single-wall carbon nanotubes on a gas-permeable filter.

To appreciate more fully the scope of the present invention, FIG. 1 presents a schematic of one embodiment showing the general flows in an apparatus useful for performing the method. One of ordinary skill in the art will recognize that other apparatus could be used and are within the scope of the invention as presently claimed. The general scheme of the method includes a carbon feedstock gas stream (provided from a carbon feedstock gas source 10) and a catalyst stream (provided by flow 12) from a catalyst addition system 14 provided to a reactor 16 for the production of single-wall carbon nanotubes.

The single-wall carbon nanotubes, any byproducts, and residual catalyst, suspended in the gas resulting after nanotube synthesis, pass from the reactor in a product stream 18 and are collected on a gas-permeable product collection filter 22. An effluent stream 24, substantially free of single-wall carbon nanotube product, is fed to a byproduct removal system 26 to remove undesirable gaseous byproducts, such as $CO_2$ and $H_2O$, among others. A recycle stream 28, consisting essentially of pure carbon feedstock gas, is passed from the byproduct removal system to a compressor 30, where the recycle stream is brought to a desired pressure for recycling to the carbon feedstock gas flow, the catalyst addition system, or both, as desired. The carbon feedstock gas fed to the reactor is heated primarily by heaters inside the reactor, and, in part, by the hot product stream gas mixture passing from the reactor through a heat exchanger section 20.

The carbon-containing feedstock gas can comprise CO, hydrocarbon or combinations thereof Examples of suitable carbon-containing gases include saturated and unsaturated aliphatic hydrocarbons, such as methane, ethane, propane, butane, hexane, ethylene, propylene and acetylene, oxygenated hydrocarbons, such as acetone, methanol, ethanol, dimethyl ether, diethyl ether, methylethyl ether, aromatic hydrocarbons, such as toluene, benzene and naphthalene. Preferably, the carbon-containing feedstock comprises CO or methane. When CO is used as the carbon feedstock, the transition metal catalyzes the Boudouard reaction (CO+CO→C+$CO_2$) to provide carbon for nanotube synthesis. When a hydrocarbon, such as methane is used as the carbon-containing feedstock, the feedstock stream can include hydrogen, a diluent gas, such as helium or argon, or combinations thereof.

The carbon-containing feedstock stream and any precursor or reactor streams are supplied at a pressure of at least the desired operating pressure in the reactor for the synthesis of single-wall carbon nanotubes. In the present invention, the operating pressure of the process for producing single-wall carbon nanotubes is in the range of about 3 atm and about 1000 atm, more preferably in the range of about 5 atm and about 500 atm, and most preferably, in the range of about 25 atm and 500 atm.

The carbon-containing feedstock gas stream is supplied at a temperature such that after mixing with any of the other incoming streams is above the minimum temperature required for single-wall carbon nanotube initiation and growth. When the refractory particles are obtained by thermolyzing a refractory precursor, the temperature of the carbon-containing feedstock gas should be sufficient such that the mixed gas stream in the reaction zone is at or above the temperature required to thermolyze the refractory precursors to refractory material and form refractory particles. The temperature of the mixed gas stream should also be sufficient to dissociate any metal catalyst precursor molecules so as to provide transition metal atoms to form clusters on the refractory particles. The temperature of the resulting mixed gas stream should also be sufficient to promote the initiation and growth of single-wall carbon nanotubes on the metal catalyst particles. Preferably, the temperature of the resulting mixed stream is in the range from about 850° C. and about 1500° C., more preferably in the range of about 900° C. and about 1100° C.

Mixing of the carbon feedstock gas stream with any streams containing the catalyst precursor, the refractory precursor, and, optionally, the refractory reactant, results in a mixed gas stream. The mixing of these streams can be performed in the reactor by any appropriate technique. The mixed gas stream may be kept at the temperature for any length of time sufficient for the growth of single-wall carbon nanotubes with desired length or other properties provided by the duration of the reaction. After time sufficient for the growth of single-wall carbon nanotubes, the resulting gas stream comprises single-wall carbon nanotubes in suspension in the mixed gas stream. The single-wall carbon nanotubes can be recovered on a gas-permeable filter sufficiently fine to remove the single-wall carbon nanotubes from the mixed gas stream.

Transition metals used as catalysts in this process for making single-wall carbon nanotubes comprise at least one metal element selected from the group consisting of Group VIb elements (chromium, molybdenum, and tungsten), Group VIIIb elements (iron, nickel, cobalt, ruthenium, rhenium, palladium, osmium, iridium, and platinum), or combinations thereof, such as molybdenum and iron. Preferably, the transition metal catalyst comprises iron, nickel or a combination thereof. Typically, a transition metal cluster contains at least one transition metal atom and generally, transition metal atoms make up more than 50 atom % of the cluster.

Transition metal clusters or particles are formed by agglomeration of metal atoms and/or metal-containing fragments from the dissociation of transition metal catalyst precursors injected into the reactor for making single-wall carbon nanotubes. Typically, transition metal catalyst precursors used in the process for synthesizing single-wall carbon nanotubes comprise carbonyls or other compounds having at least one transition metal atom of Group VIb, Group VIIIb, or a combination thereof. More typically, the transition metal-containing compound is a carbonyl-containing compound. Examples of suitable transition metal compounds include metal carbonyls, such as iron pentacarbonyl and nickel tetracarbonyl, metal carbonyl carbides, such as $Fe_5C(CO)_{15}$, cyclopentadienyl compounds, such as ferrocene, nickelocene and cobaltocene, or combinations thereof. Preferably, the transition metal precursors are volatile or sublimable.

Transition metal catalyst precursor molecules in the catalyst precursor stream can be provided at any desired concentration. The concentration of catalyst precursor in the reactor is preferably in the range from 0.3 ppm and about 50 ppm, more preferably in the range of about 1 ppm and about 25 ppm, and most preferably in the range of about 1 ppm and about 10 ppm. Higher concentrations of transition metal catalyst precursors can be used when higher concentrations of refractory precursors are used.

Typical refractory materials able to withstand high temperatures used in nanotube synthesis without degrading include metal oxides, carbides, oxycarbides, nitrides, carbonitrides, borides, sulfides, or combinations thereof, wherein the metal can comprise aluminum, magnesium, silicon, titanium, zirconium, hafnium, vanadium, niobium, tantalum, chromium, molybdenum, tungsten, rhenium, uranium, rare earth elements and mixtures thereof. Examples of rare earth elements include lanthanum, cerium, praseodymium, neodymium, promethium, samarium, europium, gadolinium, terbium, dysprosium, holmium, erbium, thulium, ytterbium and lutetium. Yttrium is also commonly considered a rare earth element. Common examples of refractory materials include ceramics, zeolites, mullite, alumina, silica, aluminosilicates, titania, zirconia, magnesia, rare earth oxides, cerium oxide, lanthanum oxide, borides, sulfides and nitrides.

Refractory particles are produced in the reactor in-situ from at least one refractory precursor. Refractory precursors are preferably volatile or sublimable compounds, examples of which include, but are not limited to, the following compounds: tetramethoxysilane $(CH_3O)_4Si$ (boiling point=121° C.), trimethoxymethylsilane $CH_3(CH_3O)_3Si$ (boiling point=102° C.), hexamethylsilicane $(CH_3)_6Si_2$ (boiling point=112° C.), titanium isopropoxide Ti(iso-$OC_3H_7)_4$ (boiling point=58° C.), trimethylaluminum $Al(CH_3)_3$ (boiling point=130° C., vapor pressure=8 mm Hg at 20° C.), aluminum isopropylate $Al(OCH(CH_3)_2)_3$ (melting point=118° C., boiling point=125–130° C., and vapor pressure=8 mm Hg at 140° C.), titanium tetrachloride $TiCl_4$ (boiling point=136° C.), silicon tetrachloride $SiCl_4$ (boiling point=57.6° C.), niobium pentachloride $NbCl_5$ (boiling point=254° C.), niobium pentafluoride $NbF_5$ (boiling point=236° C.), tantalum pentachloride $TaCl_5$ (boiling point=242° C.), tantalum pentafluoride, $TaF_5$ (boiling point=229.5° C.), tungsten hexafluoride, $WF_6$ (melting point=2.3° C., boiling point=17.5° C.), and uranium hexafluoride $UF_6$ (melting point=64.5–64.8° C., boiling point=56.2° C. at 765 mm Hg).

Refractory precursor molecules in the refractory precursor stream can be provided at any desired concentration. The concentration of refractory precursor in the reactor is typically in the range of about 0.1 ppm and about 10 ppm.

For example, refractory metal oxides can be formed by the reaction of volatile metal alkoxides with water vapor. Metal carbides can be formed by thermolysis of volatile metal alkyls, and metal oxides and oxycarbides can be formed by the thermolysis of metal alkoxides. The following reaction sequence illustrates a mechanism for the synthesis of a refractory material using the refractory precursor $(CH_3O)_4Si$ and water.

$$(CH_3O)_4Si + H_2O \rightarrow (CH_3O)_3SiOH + CH_3OH$$

$$2(CH_3O)_3SiOH \rightarrow (CH_3O)_3SiOSi(OCH_3)_3 + H_2O$$

Repetitions of this reaction sequence will eventually result in nanometer-size particles of $SiO_2$ with surface —OH groups, on which transition metal atoms, such as iron, can nucleate and cluster.

In embodiments in which a refractory reactant is used, the refractory reactant molecules in the refractory precursor stream can be provided at any desired concentration. Nominally, the concentration of refractory reactant in the reactor is dependent on the stoichiometry of the reaction mechanism between the refractory precursor and reactant. Typically, the concentration of refractory reactant in the reactor is in the range of about 0.1 ppm and about 10 ppm. Higher concentrations would be used when higher concentrations of refractory precursors are used.

The molar ratio of the refractory precursor to refractory reactant is typically in the range of about 10:1 and about 1:3. The molar ratio of metal from the transition metal precursor to refractory precursor is typically in the range of about 20:1 to about 1:10.

When the transition metal atoms agglomerate to a sufficient size, they can initiate and grow single-wall carbon nanotubes. The size of the metal cluster on the refractory particle provides a control mechanism for the diameter of the resulting single-wall carbon nanotube. If the catalyst clusters are generally the same size, and reaction conditions are controlled such that minimal catalyst agglomeration occurs, the resulting catalyst clusters can be highly homogeneous and produce a proportional population of single-wall carbon nanotubes having conformational homogeneity. Catalyst clusters in the diameter range of about 0.5 nm to about 3 nm are conducive for synthesizing single-wall carbon nanotubes. Preferably, the diameter of the catalyst clusters is in the range of about 0.7 nm to about 2.5 nm. Preferably, the diameter of the catalyst clusters is in the range of about 1.0 nm to about 1.2 nm. The size of the refractory particle is typically at least about 0.2 nm.

The embodiments of the present invention provide an improved method of producing a single-wall carbon nanotube product comprising single-wall carbon nanotubes in higher yield and catalyst productivity. The single-wall carbon nanotubes in the product can be separate nanotubes, grouped in bundles of one or more nanotubes or in the form of ropes, comprising 10 or more nanotubes, wherein the single-wall carbon nanotubes in the bundles or ropes are generally aligned and held together by van der Waals forces.

Due to the enhanced homogeneity of the catalyst clusters, the single-wall carbon nanotube product of the present invention can be of high purity with only minor amounts of impurities, such as amorphous carbon and metal catalyst residues. Generally, the amount of catalyst remaining is less than about 5 to 7 atom %. Preferably, the amount of catalyst is less than about 4 atom %. More preferably, the amount of catalyst is less than about 2 atom %. Of all the carbon atoms in the single-wall carbon nanotube product of the present invention, about 90% of the carbon atoms can be in the form of single-wall carbon nanotubes. Preferably, at least about 95% of the carbon atoms in the nanotube product are in the form of single-wall carbon nanotubes. More preferably, at least about 99% of the carbon atoms in the nanotube product are in the form of single-wall carbon nanotubes.

The present invention provides a means for controlling the yield and homogeneity of the single-wall carbon nanotubes produced by controlling the population and homogeneity of the metal clusters available for synthesizing single-wall carbon nanotubes beginning at or near the inlet of the reactor. The diameter and conformation of the single-wall carbon nanotubes produced can be generally in the size range and type desired. In general, the diameter of the single-wall carbon nanotube can be controlled in the desired range of about 0.6 nm to about 3 nm. The preferred diameter range and conformation of the single-wall carbon nanotubes produced is dependent on the application of use. The length of the single-wall carbon nanotubes is highly dependent upon the residence time, temperature, pressure, and other parameters in the reactor for nanotube production. The preferred length of the single-wall carbon nanotubes is also dependent on the application of use.

The single-wall carbon nanotubes in the product can be of high purity and useful in many applications without further purification steps. However, for certain applications, purification of the single-wall carbon nanotube product may be performed by techniques known to those of ordinary skill in the art.

The carbon nanotubes produced may be used for a variety of applications known to one of ordinary skill in the art. Such applications include, but are not limited to, electrical connectors in microdevices (e.g., integrated circuits or semiconductor chips), antennas, optical antennas, probes for scanning tunneling microscopy (STM) or atomic force microscopy (AFM), additive to or substitute for carbon black (e.g., in motor vehicle tires), catalysts in industrial and chemical processes, power transmission cables, solar cells, batteries, molecular electronics, probes, manipulators, and composites, among others.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

This example serves as a control in which a catalyst comprising transition metal clusters without refractory precursors or particles was used to synthesize single-wall carbon nanotubes.

Single-wall carbon nanotubes were synthesized in a high temperature, high pressure, "once-through," gas-phase reactor using CO as the feedstock gas and iron as the transition metal catalyst. The CO was heated to about 1075° C. and flowed into the reactor at a rate of 500 standard liters per minute. A dilute stream of the iron catalyst precursor, iron pentacarbonyl $Fe(CO)_5$, in CO was prepared by bubbling CO at room temperature through liquid iron pentacarbonyl, also at room temperature. Additional CO was added such that the flowrate of the catalyst precursor stream into the reactor was 50 standard liters per minute and the concentration of iron pentacarbonyl in the reactor was about 1.5 ppm. The reactor was operated at 430 psig and 1075° C. $CO_2$ in the gaseous stream exiting the reactor was correlated, via the Boudouard reaction, with the production of single-wall carbon nanotubes generated in the reactor. The inlet $CO_2$ ranged from 0 to 2 ppm. An indication of approximately 50 to 60 ppm $CO_2$ in the gas stream exiting the reactor correlates to a production rate of about 1 gram per hour of single-wall carbon nanotubes. The present experiment had an indication of 49 to 52 ppm $CO_2$ in the exit gas.

Example 2

In this example, single-wall carbon nanotubes were synthesized with a catalyst consisting of transition metal particles generated from iron pentacarbonyl and refractory particles generated from titanium isopropoxide without water.

Single-wall carbon nanotubes were synthesized in a high temperature, high pressure, "once-through," gas-phase reactor using CO as the feedstock gas and iron as the transition metal catalyst. The CO was heated to about 1075° C. and flowed into the reactor at a rate of 500 standard liters per minute. Separate dilute streams comprising iron catalyst precursor, iron pentacarbonyl $Fe(CO)_5$, in CO and refractory precursor, titanium isopropoxide $Ti(iso-OC_3H_7)_4$ (boiling point=58° C.), in CO were prepared by bubbling individual streams of room temperature CO through separate flasks of the catalyst precursor and the refractory precursor. Additional CO was added such that the sum of the flow rates of the catalyst precursor-containing stream, the refractory precursor-containing stream and the additional CO was 50 standard liters per minute. The concentrations of the iron pentacarbonyl and refractory precursor in the reactor were about 1.5 ppm and 0.11 ppm, respectively. The reactor was operated at 430 psig and 1075° C. $CO_2$ in the gaseous stream exiting the reactor was correlated, via the Boudouard reaction, with the production of single-wall carbon nanotubes generated in the reactor. The inlet $CO_2$ ranged from 0 to 1 ppm. An indication of approximately 50 to 60 ppm $CO_2$ in the gas stream exiting the reactor correlates to a production rate of about 1 gram per hour of single-wall carbon nanotubes. The present experiment had an indication of 49 to 55 ppm $CO_2$ in the outlet gas.

Example 3

In this example, single-wall carbon nanotubes were synthesized with a catalyst consisting of transition metal particles generated from iron pentacarbonyl and refractory particles generated from titanium isopropoxide with water.

Single-wall carbon nanotubes were synthesized in a high temperature, high pressure, "once-through," gas-phase reactor using CO as the feedstock gas and iron as the transition metal catalyst. The CO was heated to about 1075° C. and flowed into the reactor at a rate of 500 standard liters per minute. Separate dilute streams comprising iron catalyst precursor, iron pentacarbonyl $Fe(CO)_5$, in CO, refractory precursor, titanium isopropoxide $Ti(iso-OC_3H_7)_4$ (boiling point=58° C.), in CO, and water in CO were prepared by bubbling individual streams of room temperature CO through separate flasks of the catalyst precursor, the refractory precursor and water. Additional CO was added such that the sum of the flow rates of the catalyst precursor-containing stream, the refractory precursor-containing stream, the water-containing stream and the additional CO was 50 standard liters per minute. The concentrations of the iron pentacarbonyl, refractory precursor and water in the reactor were about 1.5 ppm, 0.11 ppm, and 0.33 ppm, respectively. The reactor was operated at 430 psig and 1075° C. $CO_2$ in the gaseous stream exiting the reactor was correlated, via the Boudouard reaction, with the production of single-wall carbon nanotubes generated in the reactor. The inlet $CO_2$ was not measured, but ranged from 0 to 2 ppm for experiments done in the same time frame. An indication of approximately 50 to 60 ppm $CO_2$ in the gas stream exiting the reactor correlates to a production rate of about 1 gram per hour of single-wall carbon nanotubes. The present experiment had an indication of 51 to 56 ppm $CO_2$ in the outlet gas.

Example 4

In this example, single-wall carbon nanotubes were synthesized with a catalyst consisting of transition metal particles generated from iron pentacarbonyl and refractory particles generated from tetramethoxysilane without water.

Procedures described in Example 2 were used except that tetramethoxysilane $(CH_3O)_4Si$ (boiling point=121° C.) was used as the refractory precursor. The reactor concentrations of iron pentacarbonyl and refractory precursor were about 1.5 ppm and 0.11 ppm, respectively. The inlet $CO_2$ was not measured, but ranged from 0 to 2 ppm for experiments done in the same time frame. The outlet $CO_2$ concentration was measured at 49 to 50 ppm.

Example 5

In this example, single-wall carbon nanotubes were synthesized with a catalyst consisting of transition metal particles generated from iron pentacarbonyl and refractory particles generated from tetramethoxysilane and water.

Procedures described in Example 3 were used, except that tetramethoxysilane $(CH_3O)_4Si$ (boiling point=121° C.) was used as the refractory precursor. The concentrations of the iron pentacarbonyl, refractory precursor and water used in the reactor were about 1.5 ppm, 0.11 ppm, and 0.33 ppm, respectively. The inlet $CO_2$ was not measured, but ranged from 0 to 2 ppm for experiments done in the same time frame. The outlet $CO_2$ concentration was measured at 47 to 49 ppm.

Example 6

In this example, single-wall carbon nanotubes were synthesized with a catalyst consisting of transition metal particles generated from the iron carbide compound $Fe_5C(CO)_{15}$. No other catalyst or refractory particles were used.

Procedures described in Example 1 were used, except that $Fe_5C(CO)_{15}$ was used in place of iron pentacarbonyl. A dilute stream of the iron carbide in CO was prepared by placing the iron carbide in a chamber and passing CO, heated to at least 300° F., through the chamber to sublime it. Additional CO was added such that the flowrate of the iron carbide stream into the reactor was 50 standard liters per minute. Single-wall carbon nanotubes were synthesized using the conditions given in Example 1. Shortly after the iron carbide was introduced, a small increase in $CO_2$ at the outlet was observed. A small amount (i.e. 15 mg) of single-wall nanotube product was collected. Thermogravimetric analysis (TGA) analysis of the product indicated an iron content of 44.3 wt % Fe.

Example 7

In this example, single-wall carbon nanotubes were synthesized with a catalyst consisting of transition metal particles generated both from iron pentacarbonyl and from the iron carbide compound $Fe_5C(CO)_{15}$.

Procedures described in Example 1 were used, except that $Fe_5C(CO)_{15}$ was used in addition to iron pentacarbonyl. A dilute stream of the iron catalyst precursor, iron pentacarbonyl Fe(CO)₅, in CO was prepared by bubbling CO at room temperature through liquid iron pentacarbonyl, also at room temperature. A dilute stream of the iron carbide in CO was prepared by placing the iron carbide in a chamber and passing CO heated to at least 230° F. through the chamber to sublime the iron carbide. Additional CO was added such that the sum of the flow rates of the catalyst iron pentacarbonyl stream and the iron carbide stream and the additional CO was 50 standard liters per minute.

Single-wall carbon nanotubes were synthesized using the conditions given in Example 1. No increase in $CO_2$ concentration at the outlet was observed with an iron pentacarbonyl reactor concentration of 0.375 ppm. No increase of $CO_2$ concentration at the outlet was observed using iron pentacarbonyl reactor concentration of 1.5 ppm with either a 230° F. or a 260° F. iron carbide sublimation temperature.

Example 8

In this example, single-wall carbon nanotubes were synthesized with a catalyst consisting of transition metal particles generated from ferrocene. No other catalyst or refractory particles were used.

Procedures described in Example 1 were used, except that ferrocene was used in place of iron pentacarbonyl. A dilute stream of ferrocene in CO was prepared by placing the ferrocene in a chamber and passing heated CO through the chamber to sublime it. The temperature of the CO passing into the sublimator was increased each half hour from an initial temperature of 150–160° F. to a final temperature of 245° F. in 15° F. increments. Additional CO was added such that the flowrate of the ferrocene stream into the reactor was 50 standard liters per minute. Single-wall carbon nanotubes were synthesized using the conditions given in Example 1. No significant increase in $CO_2$ at the outlet was observed. About 10 mg of single-wall nanotube product was collected after the sublimator temperature reached 212° F. TGA analysis of the product indicated an iron content of 39.3 wt % Fe.

Example 9

In this example, single-wall carbon nanotubes were synthesized with a catalyst consisting of transition metal particles generated from iron pentacarbonyl and refractory particles generated from trimethylaluminum without water.

Procedures described in Example 2 were used, except that tetramethylaluminum (TMA) (Al(CH₃)₃) (boiling point=130° C., vapor pressure=8 mm Hg at 20° C.) was used as the refractory precursor. The concentrations of the iron pentacarbonyl and refractory precursor used in the reactor were about 1.5 ppm and 0.15 ppm, respectively. After introducing the iron pentacarbonyl, and prior to introducing the refractory precursor, the inlet and outlet $CO_2$ were measured at 0 ppm and 37 ppm, respectively.

The iron pentacarbonyl concentration was reduced to about 0.375 ppm in the reactor. TMA was introduced and within about a minute, the $CO_2$ in the outlet increased to about 430 ppm. The $CO_2$ level decreased over the next hour and a half and leveled off about 20 to 25 ppm. The large increase in $CO_2$ was considered transient and attributed to impurities in the apparatus.

The iron pentacarbonyl was increased back to 1.5 ppm in the reactor and the $CO_2$ outlet concentration in the outlet returned to 37 ppm, same as the initial concentration without the TMA.

Example 10

In this example, single-wall carbon nanotubes were synthesized with a catalyst consisting of transition metal particles generated from iron pentacarbonyl and refractory particles generated from trimethylaluminum (TMA) and water, at a ratio of 1 to 3. The ratio of iron to refractory precursor was about 2.5 to 1.

Procedures described in Example 3 were used, except that TMA was used as the refractory precursor and the reactor concentrations of iron pentacarbonyl, refractory precursor and water were about 0.375 ppm, 0.15 ppm, and 0.45 ppm, respectively.

The iron pentacarbonyl, TMA and water were added sequentially and the outlet $CO_2$ monitored. Prior to adding the iron pentacarbonyl, the outlet $CO_2$ was 4.5 ppm. With addition of iron pentacarbonyl, the outlet $CO_2$ increased to 38 ppm. TMA was introduced and the outlet $CO_2$ concentration was essentially unchanged at 35 ppm. Addition of water after about 30 minutes produced no change in the outlet $CO_2$ concentration.

Example 11

In this example, single-wall carbon nanotubes were synthesized with a catalyst consisting of transition metal particles generated from iron pentacarbonyl and refractory particles generated from trimethylaluminum (TMA) and water at a ratio of 1 to 3. The ratio of iron to refractory precursor (TMA) was about 10 to 1.

After performing the procedures described in Example 10, the iron pentacarbonyl reactor concentration was increased to 1.5 ppm, while keeping the TMA and water concentrations the same, such that the reactor concentrations of iron pentacarbonyl, refractory precursor and water were about 1.5 ppm, 0.15 ppm, and 0.45 ppm, respectively. No increase the outlet $CO_2$ was observed.

Example 12

In this example, single-wall carbon nanotubes were synthesized with a catalyst consisting of transition metal particles generated from iron pentacarbonyl and refractory particles generated with TMA and water at a ratio of 1 to 3 and a 1 to 1 ratio of iron pentacarbonyl to refractory precursor.

Procedures described in Example 10 were used, except for higher catalyst component concentrations. The reactor concentration of iron pentacarbonyl was about 1.5 ppm. The iron pentacarbonyl, TMA and water were added sequentially and the outlet $CO_2$ monitored. After adding iron pentacarbonyl, the inlet and $CO_2$ concentrations were 0 ppm and 51–67 ppm, respectively. TMA was introduced at a reactor concentration of 1.5 ppm and the outlet $CO_2$ concentration was essentially unchanged. After about one hour, water was introduced at a reactor concentration of about 4.5 ppm with no change in the outlet $CO_2$ concentration.

Example 13

In this example, single-wall carbon nanotubes were synthesized with a catalyst consisting of transition metal particles generated from iron pentacarbonyl and refractory particles generated with TMA and water at ratio of 2 to 3 and a 1 to 2 ratio of iron pentacarbonyl to TMA refractory precursor.

After performing the procedures described in Example 12, in which the iron pentacarbonyl and water reactor concentrations were 1.5 ppm and 4.5 ppm, the TMA concentration was raised from 1.5 ppm to 3 ppm. Following this increase, the outlet concentration of $CO_2$ increased from the former 51–67 ppm level to greater than 130 ppm, which is about two times the outlet concentration of $CO_2$ using only iron pentacarbonyl without refractory precursors.

Example 14

In this example, single-wall carbon nanotubes were synthesized with a catalyst consisting of transition metal particles generated from iron pentacarbonyl and refractory particles generated with TMA and water at a ratio of 6 to 1 and a 1 to 2 ratio of iron pentacarbonyl to refractory precursor.

After performing the procedures described in Example 12, in which the iron pentacarbonyl and TMA reactor concentrations were 1.5 ppm and 3.0 ppm, respectively, the water concentration was lowered from 4.5 ppm to 0.5 ppm. Following this change, the concentration of $CO_2$ in the outlet increased to greater than 300 ppm, which is about 5 to 6 times the expected 50–60 ppm the outlet $CO_2$ concentration using only iron pentacarbonyl.

Figure 2A:
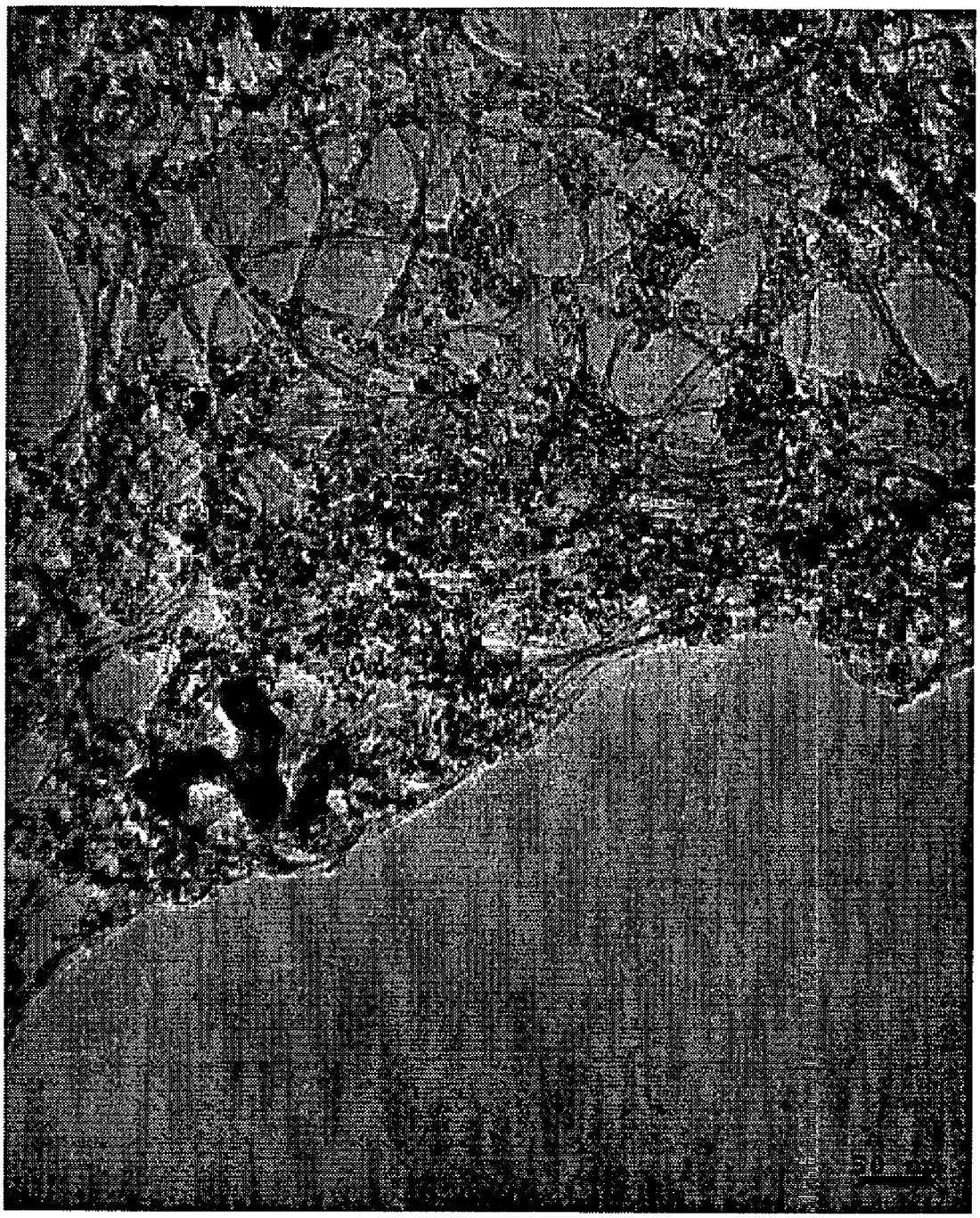
FIGS. 2A and 2B show a transmission electron micrograph (FIG. 2B at a higher magnification) of single-wall carbon nanotube product made according to one embodiment of the present invention.
Figure 2B:

Single-wall carbon nanotube product was collected for 2 hours during the time in which the outlet $CO_2$ concentration was 300 ppm. The rate of production during that time showed a three-fold increase of 2.7 g/hour with refractory particle nucleation versus 0.9 g/hour using only iron pentacarbonyl. Product analysis indicated that the single-wall carbon nanotube product made with catalyst generated from iron pentacarbonyl and refractory particles obtained from TMA and water had similar purity (72% carbon) as product catalyzed only with iron pentacarbonyl (73% carbon). Transmission electron micrographs of the single-wall carbon nanotube product generated in this example are shown in FIGS. 2A and 2B. FIG. 2B is at a higher magnification.

Table 1 gives a summary of the examples.

TABLE 1

Summary of Effect of Refractory Concentration on Outlet $CO_2$ Production

| Example No. (Refractory precursor)* | $Fe(CO)_5$ (ppm) | Refractory Precursor (ppm) | Refractory Reactant ($H_2O$) (ppm) | Refractory Precursor to Reactant Molar Ratio | Fe to Refractory Precursor Molar Ratio | Refractory Effect on Outlet $CO_2$ |
|---|---|---|---|---|---|---|
| 1 (Control) | 1.5 | — | — | — | — | N/A |
| 2 (Ti-i-P) 4 (TMS) | 1.5 | 0.11 | — | N/A | 14:1 | No increase |
| 3 (Ti-i-P) 5 (TMS) | 1.5 | 0.11 | 0.33 | 1:3 | 14:1 | No increase |
| 6 ($Fe_5C(CO)_{15}$) | — | Unknown | — | N/A | Unknown | Small increase |
| 7 ($Fe_5C(CO)_{15}$) | 0.375/1.5 | Unknown | — | N/A | Unknown | No increase |
| 8 (Ferrocene) | — | Unknown | — | N/A | Unknown | No increase |
| 9 (TMA) | 0.375/1.5 | 0.15 | — | N/A | 2.5:1/ 10:1 | No increase |
| 10 (TMA) | 0.375 | 0.15 | 0.45 | 1:3 | 2.5:1 | No increase |
| 11 (TMA) | 1.5 | 0.15 | 0.45 | 1:3 | 10:1 | No increase |
| 12 (TMA) | 1.5 | 1.5 | 4.5 | 1:3 | 1:1 | No increase |
| 13 (TMA) | 1.5 | 3.0 | 4.5 | 2:3 | 1:2 | 2-fold increase |
| 14 (TMA) | 1.5 | 3.0 | 0.5 | 6:1 | 1:2 | 5 to 6-fold increase |

*Ti-i-P = Titanium isopropoxide,
TMS = tetramethoxysilane, and
TMA = trimethylaluminum,
N/A = Not applicable The ratio of metal atoms from the transition metal catalyst precursor and refractory precursor is dependent on the particular combination employed. Generally, a higher concentration of refractory precursor to transition metal catalyst precursor is preferred. The ratio of refractory precursors to refractory reactant is dependent on the particular precursor and reactant employed. When TMA is the refractory precursor and water the refractory reactant, ratios greater than 1 part TMA to 3 parts water are preferred. More preferably, the ratio of TMA to water is 2 to 3 and, and even more preferably 6 to 1.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents-described herein while the same or similar results would be achieved. All such similar substitutes and modifications apparent to those skilled in the art are deemed to be within the spirit, scope and concept of the invention as defined by the appended claims.

What is claimed is:

1. A method for producing single-wall carbon nanotubes comprising:
   (a) providing a transition metal catalyst precursor stream comprising a carrier gas and a transition metal catalyst precursor comprising at least one atom of at least one transition metal selected from the group consisting of Group VIb elements, Group VIIIb elements and combinations thereof, wherein the transition metal catalyst precursor stream is at a temperature below the decomposition temperature of the transition metal catalyst precursor;

(b) providing a refractory precursor stream comprising a carrier gas and a refractory precursor, wherein the refractory precursor comprises a metal element selected from the group consisting of aluminum, magnesium, silicon, titanium, zirconium, hafnium, vanadium, niobium, tantalum, chromium, molybdenum, tungsten, rhenium, uranium, rare earth elements and mixtures thereof, and wherein the refractory precursor is at a temperature below the thermolysis temperature of the refractory precursor;

(c) providing a carbon-containing feedstock gas stream at a temperature above the minimum single-wall carbon nanotube formation initiation temperature; and (d) mixing the carbon-containing feedstock gas stream with the transition metal catalyst precursor stream and the refractory precursor stream to form a mixed gas stream, wherein
  (i) the transition metal catalyst precursor reaches a temperature above the decomposition temperature of the transition metal catalyst precursor,
  (ii) the refractory precursor reaches a temperature above the thermolysis temperature of the refractory precursor and forms refractory particles,
  (iii) the temperature is sufficient to promote the initiation and growth of metal catalyst clusters on the refractory particles, and
  (iv) the temperature is sufficient to promote the initiation and growth of single-wall carbon nanotubes on the metal catalyst clusters and to form the single-wall carbon nanotubes in the mixed gas stream.

2. The method of claim 1, wherein the carrier gas comprises a compound selected from the group consisting of CO, nitrogen, inert gases and mixtures thereof.

3. The method of claim 1, wherein the carrier gas comprises CO.

4. The method of claim 1 wherein the transition metal catalyst precursor comprises an element selected from the group consisting of chromium, molybdenum, tungsten, iron, nickel, cobalt, ruthenium, rhenium, palladium, osmium, iridium, platinum, and combinations thereof.

5. The method of claim 1 wherein the transition metal catalyst precursor comprises a carbonyl.

6. The method of claim 5 wherein the carbonyl is selected from the group consisting of $Fe(CO)_5$, $Ni(CO)_4$, and combinations thereof.

7. A method for producing single-wall carbon nanotubes comprising:
  (a) providing a transition metal catalyst precursor stream comprising a carrier gas and a transition metal catalyst precursor comprising at least one atom of at least one transition metal selected from the group consisting of Group VIb elements, Group VIIIb elements and combinations thereof, wherein the transition metal catalyst precursor stream is at a temperature below the decomposition temperature of the transition metal catalyst precursor;
  (b) providing a refractory precursor stream comprising a carrier gas and a refractory precursor, wherein the refractory precursor comprises a compound selected from the group consisting of tetramethoxysilane, trimethoxymethylsilane, hexamethylsilicane, titanium isopropoxide, trimethylaluminum, aluminum isopropylate, titanium tetrachloride, silicon tetrachloride, niobium pentachloride, niobium pentafluoride, tantalum pentachloride, tantalum pentafluoride, tungsten hexafluoride, uranium hexafluoride and combinations thereof, and wherein the refractory precursor is at a temperature below the thermolysis temperature of the refractory precursor;
  (c) providing a carbon-containing feedstock gas stream at a temperature above the minimum single-wall carbon nanotube formation initiation temperature; and
  (d) mixing the carbon-containing feedstock gas stream with the transition metal catalyst precursor stream and the refractory precursor stream to form a mixed gas stream, wherein
    (i) the transition metal catalyst precursor reaches a temperature above the decomposition temperature of the transition metal catalyst precursor,
    (ii) the refractory precursor reaches a temperature above the thermolysis temperature of the refractory precursor and forms refractory particles,
    (iii) the temperature is sufficient to promote the initiation and growth of metal catalyst clusters on the refractory particles, and
    (iv) the temperature is sufficient to promote the initiation and growth of single-wall carbon nanotubes on the metal catalyst clusters and to form the single-wall carbon nanotubes in the mixed gas stream.

8. The method of claim 1 wherein the refractory precursor is volatile.

9. The method of claim 1 wherein the refractory precursor is sublimable.

10. The method of claim 1 wherein the refractory particles comprise compounds selected from the group consisting of metal oxides, carbides, oxycarbides, carbonitrides, nitrides, sulfides, borides and combinations thereof.

11. A method for producing single-wall carbon nanotubes comprising:
  (a) providing a transition metal catalyst precursor stream comprising a carrier gas and a transition metal catalyst precursor comprising at least one atom of at least one transition metal selected from the group consisting of Group VIb elements, Group VIIIb elements and combinations thereof, wherein the transition metal catalyst precursor stream is at a temperature below the decomposition temperature of the transition metal catalyst precursor;
  (b) providing a refractory precursor stream comprising a carrier gas and a refractory precursor, wherein the refractory precursor is at a temperature below the thermolysis temperature of the refractory precursor;
  (c) providing a carbon-containing feedstock gas stream at a temperature above the minimum single-wall carbon nanotube formation initiation temperature; and
  (d) mixing the carbon-containing feedstock gas stream with the transition metal catalyst precursor stream and the refractory precursor stream to form a mixed gas stream, wherein
    (i) the transition metal catalyst precursor reaches a temperature above the decomposition temperature of the transition metal catalyst precursor,
    (ii) the refractory precursor reaches a temperature above the thermolysis temperature of the refractory precursor and forms refractory particles, wherein the refractory particles comprise a refractory material selected from the group consisting of ceramic, zeolite, mullite, alumina, silica, aluminosilicate, titania, zirconia, magnesia, rare earth oxides, cerium oxide, lanthanum oxide and combinations thereof,
  (iii) the temperature is sufficient to promote the initiation and growth of metal catalyst clusters on the refractory particles, and
  (iv) the temperature is sufficient to promote the initiation and growth of single-wall carbon nanotubes on the metal catalyst clusters and to form the single-wall carbon nanotubes in the mixed gas stream.

12. The method of claim 1 wherein the refractory precursor is present in a greater concentration than the transition metal catalyst precursor.

13. The method of claim 1, wherein the carbon-containing feedstock gas comprises a gas selected from the group consisting of CO, hydrocarbons, and mixtures thereof.

14. The method of claim 1, wherein the carbon-containing feedstock gas comprises CO.

15. The method of claim 1, wherein the pressure of the mixed gas stream is between about 3 atm and about 1000 atm.

16. The method of claim 1, wherein the temperature of the mixed gas stream is in a range of about 850° C. and about 1500° C.

17. The method of claim 1, wherein the temperature of the mixed gas stream is in a range of about 900° C. and about 1100° C.

18. The method of claim 1 further comprising recovering a single-wall carbon nanotube product from the mixed gas stream.

19. The method of claim 18, wherein the recovering step comprises passing the mixed gas stream through a gas-permeable filter.

20. A method for producing single-wall carbon nanotubes comprising:
  (a) providing a transition metal catalyst precursor stream comprising a carrier gas and a transition metal catalyst precursor comprising at least one atom of at least one transition metal selected from the group consisting of Group VIb elements, Group VIIIb elements and combinations thereof, wherein the transition metal catalyst precursor stream is at a temperature below the decomposition temperature of the transition metal catalyst precursor;
  (b) providing a refractory precursor stream, comprising a carrier gas and a refractory precursor,
  (c) providing a refractory reactant stream comprising a refractory reactant compound capable of reacting with the refractory precursor to form a refractory material;
  (d) providing a carbon-containing feedstock gas stream at a temperature above the minimum single-wall carbon nanotube formation initiation temperature; and
  (e) mixing the carbon-containing feedstock gas stream with refractory precursor stream, the refractory reactant stream, and the transition catalyst precursor stream to form a mixed gas stream, wherein
    (i) the transition metal catalyst precursor reaches a temperature above the decomposition temperature of the transition metal catalyst precursor,
    (ii) the refractory precursor reacts with the refractory reactant to form refractory particles,
    (iii) the temperature is sufficient to promote the initiation and growth of metal catalyst clusters on the refractory particles, and
    (iv) the temperature is sufficient to promote the initiation and growth of single-wall carbon nanotubes on the metal catalyst clusters and to form the single-wall carbon nanotubes in the mixed gas stream.

21. The method of claim 20, wherein the carrier gas comprises a compound selected from the group consisting of CO, nitrogen, inert gases and mixtures thereof.

22. The method of claim 20, wherein the carrier gas comprises CO.

23. The method of claim 20, wherein the transition metal catalyst precursor comprises an element selected from the group consisting of chromium, molybdenum, tungsten, iron, nickel, cobalt, ruthenium, rhenium, palladium, osmium, iridium, platinum, and combinations thereof.

24. The method of claim 20, wherein the transition metal catalyst precursor comprises a carbonyl.

25. The method of claim 24, wherein the carbonyl is selected from the group consisting of $Fe(CO)_5$, $Ni(CO)_4$, and combinations thereof.

26. The method of claim 20 wherein the refractory precursor comprises a metal element selected from the group consisting of aluminum, magnesium, silicon, titanium, zirconium, hafnium, vanadium, niobium, tantalum, chromium, molybdenum, tungsten, rhenium, uranium, rare earth elements and mixtures thereof.

27. The method of claim 20 wherein the refractory precursor comprises a compound selected from the group consisting of tetramethoxysilane, trimethoxymethylsilane, hexamethylsilicane, titanium isopropoxide, trimethylaluminum, aluminum isopropylate, titanium tetrachloride, silicon tetrachloride, niobium pentachloride, niobium pentafluoride, tantalum pentachloride, tantalum pentafluoride, tungsten hexafluoride, uranium hexafluoride and combinations thereof.

28. The method of claim 20 wherein the refractory precursor is volatile.

29. The method of claim 20 wherein the refractory precursor is sublimable.

30. The method of claim 20 wherein the refractory precursor is present in a greater concentration than the transition metal catalyst precursor.

31. The method of claim 20 wherein the refractory precursor comprises trimethylaluminum.

32. The method of claim 20 wherein the refractory reactant comprises water.

33. The method of claim 20 wherein the refractory precursor comprises trimethylaluminum and the refractory reactant comprises water.

34. The method of claim 33 wherein the trimethylaluminum and the water are in a ratio of at least about 1 part TMA to 3 parts water.

35. The method of claim 33 wherein the trimethylaluminum and the water are in a ratio of at least about 2 parts TMA to 3 parts water.

36. The method of claim 33 wherein the trimethylaluminum and the water are in a ratio of at least about 6 parts TMA to 1 part water.

37. The method of claim 20 wherein the refractory particles comprise compounds selected from the group consisting of metal oxides, carbides, oxycarbides, carbonitrides, nitrides, sulfides, borides and combinations thereof.

38. The method of claim 20 wherein the refractory particles comprise refractory material selected from the group comprising ceramic, zeolite, mullite, alumina, silica, aluminosilicate, titania, zirconia, magnesia, rare earth oxides, cerium oxide, lanthanum oxide and combinations thereof.

39. The method of claim 20 wherein the refractory particles comprise alumina.

40. The method of claim 20, wherein the carbon-containing feedstock gas comprises a gas selected from the group consisting of CO, hydrocarbons, and mixtures thereof.

41. The method of claim 20, wherein the carbon-containing feedstock gas comprises CO.

42. The method of claim 20, wherein the pressure of the mixed gas stream is in a range of about 3 atm and about 1000 atm.

43. The method of claim 20, wherein the temperature of the mixed gas stream is in a range of about 850° C. and about 1500° C.

44. The method of claim 20, wherein the temperature of the mixed gas stream is in a range of about 900° C. and about 1100° C.

45. The method of claim 20 further comprising recovering a single-wall carbon nanotube product from the mixed gas stream.

46. The method of claim 45, wherein the recovering step comprises passing the mixed gas stream through a gas-permeable filter.

47. The method of claim 1, wherein metal from the transition metal catalyst precursor and the refractory precursor are present in the mixed stream in a metal/refractory precursor molar ratio (moles of the metal to moles of the refractory precursor) between 20:1 to about 1:10.

48. A method for producing single-wall carbon nanotubes comprising:
(a) providing a transition metal catalyst precursor stream comprising a carrier gas and a transition metal catalyst precursor, wherein the transition metal catalyst precursor stream is at a temperature below the transition metal catalyst precursor's decomposition temperature;
(b) providing a refractory precursor stream comprising a carrier gas and a refractory precursor;
(c) providing a carbon-containing feedstock gas stream at a temperature above which formation of single-wall carbon nanotube formation can be initiated;
(d) mixing the carbon-containing feedstock gas stream with the transition metal catalyst precursor stream and the refractory precursor stream to form a mixed gas stream;
(e) providing a refractory reactant stream comprising a refractory reactant compound capable of reacting with the refractory precursor to form a refractory material;
(f) mixing the refractory reactant stream in the mixed gas stream; and
(g) growing single-wall carbon nanotubes in the mixed stream.

49. The method of claim 48, wherein metal from the transition metal catalyst precursor and the refractory precursor are present in the mixed stream in a metal/refractory precursor molar ratio (moles of the metal to moles of the refractory precursor) between about 20:1 and about 1:10.

50. The method of claim 49, wherein the refractory precursor and the refractory reactant compound are present in the mixed stream in a refractory precursor/refractory reactant compound ratio (moles of the refractory precursor to moles of the refractory reactant compound) between about 10:1 and about 1:3.

* * * * *